US012720094B2

(12) United States Patent
Yasugi et al.

(10) Patent No.: US 12,720,094 B2
(45) Date of Patent: Aug. 25, 2026

(54) VIDEO DECODING APPARATUS, VIDEO CODING APPARATUS, AND ANGULAR MODE DERIVATION APPARATUS

(71) Applicant: SHARP KABUSHIKI KAISHA, Sakai City (JP)

(72) Inventors: Yukinobu Yasugi, Sakai City (JP); Tomohiro Ikai, Sakai City (JP); Tomoko Aono, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/870,517

(22) PCT Filed: May 26, 2023

(86) PCT No.: PCT/JP2023/019656
§ 371 (c)(1),
(2) Date: Nov. 29, 2024

(87) PCT Pub. No.: WO2023/234200
PCT Pub. Date: Dec. 7, 2023

(65) Prior Publication Data

US 2025/0350753 A1 Nov. 13, 2025

(30) Foreign Application Priority Data

Jun. 2, 2022 (JP) ................................ 2022-090076
Jun. 16, 2022 (JP) ................................ 2022-096934

(51) Int. Cl.
*H04N 19/44* (2014.01)
*H04N 19/182* (2014.01)

(52) U.S. Cl.
CPC .......... *H04N 19/44* (2014.11); *H04N 19/182* (2014.11)

(58) Field of Classification Search
CPC .... H04N 19/44; H04N 19/182; H04N 19/136; H04N 19/11; H04N 19/176
(Continued)

(56) References Cited

U.S. PATENT DOCUMENTS

2017/0302962 A1* 10/2017 Shen ...................... H04N 19/14
2022/0060744 A1* 2/2022 Lee ...................... H04N 19/159
2025/0254292 A1* 8/2025 Tsai ...................... H04N 19/80

FOREIGN PATENT DOCUMENTS

WO WO-2025032844 A1 * 2/2025 ............ H04N 19/11

OTHER PUBLICATIONS

Mohsen Abdoli et al., "Non-CE3: Decoder-side Intra Mode Derivation with Prediction Fusion Using Planar", Document: JVET-O0449-v2, Joint Video Experts Team (JVET) of ITU-T SG 16 WP 3 and ISO/IEC JTC 1/SC 29/WG 11, 15th Meeting: Gothenburg, SE, Jul. 3-12, 2019.

(Continued)

*Primary Examiner* — Marnie A Matt
(74) *Attorney, Agent, or Firm* — ScienBiziP, P.C.

(57) ABSTRACT

In a conventional angular mode derivation, comparison of a magnitude relationship is required multiple times to convert gradients of pixel values into an angular mode, and this hinders parallel processing. A gradient derivation unit configured to derive a first gradient being a gradient of a pixel value included in a gradient derivation target image, and an angular mode derivation unit configured to derive an angular mode, using the first gradient, a second gradient different from the first gradient, and two prescribed tables are included.

2 Claims, 13 Drawing Sheets

(58) Field of Classification Search
USPC .................................................... 375/240.25
See application file for complete search history.

(56) References Cited

OTHER PUBLICATIONS

Jianle Chen et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

Xiaoyu Xiu et al., "AHG12: Removal of floating operations in DMD and TIMD", Document: JVET-X0149-v1, Joint Video Experts Team (JVET) of ITU-T SG 16 WP 3 and ISO/IEC JTC 1/SC 29, 24th Meeting, by teleconference, Oct. 6-15, 2021.

Mohsen Abdoli et al., "Gradient-Based Intraprediction Fusion for Video Coding ", IEEE MultiMedia, Dec. 3, 2020 [retrieved on Jul. 13, 2023], vol. 28 , Issue: 3, pp. 88-96, Retrieved from the Internet: <URL: https://ieeexplore.ieee.org/a bstract/document/9280348>, <DOI:10.1109/MMUL.2020.3042280>.

* cited by examiner

| coding_unit( x0, y0, cbWidth, cbHeight, treeType ) { | **Descriptor** |
|---|---|
| ... | |
| if( CuPredMode[ x0 ][ y0 ] = = MODE_INTRA ) { | |
| **dimd_flag[x0][y0]** | |
| { | |
| if( treeType = = SINGLE_TREE \|\| treeType = = DUAL_TREE_LUMA && dimd_flag[ x0 ][ y0 ] == 0) { | |
| if( cbWidth <= 32 && cbHeight <= 32 ) | |
| **intra_bdpcm_flag**[ x0 ][ y0 ] | ae(v) |
| if( intra_bdpcm_flag[ x0 ][ y0 ] ) | |
| **intra_bdpcm_dir_flag**[ x0 ][ y0 ] | ae(v) |
| else { | |
| if( sps_mip_enabled_flag && ( Abs( Log2( cbWidth ) − Log2( cbHeight ) ) <= 2 ) && cbWidth <= MaxTbSizeY && cbHeight <= MaxTbSizeY && dimd_flag[ x0 ][ y0 ] == 0 ) | |
| **intra_mip_flag**[ x0 ][ y0 ] | ae(v) |
| if( intra_mip_flag[ x0 ][ y0 ] ) { | |
| **intra_mip_mpm_flag**[ x0 ][ y0 ] | ae(v) |
| if( intra_mip_mpm_flag[ x0 ][ y0 ] ) | |
| **intra_mip_mpm_idx**[ x0 ][ y0 ] | ae(v) |
| else | |
| **intra_mip_mpm_remainder**[ x0 ][ y0 ] | ae(v) |
| } else { | |
| if( sps_mrl_enabled_flag && ( ( y0 % CtbSizeY ) > 0 ) && dimd_flag[ x0 ][ y0 ] == 0) | |
| **intra_luma_ref_idx**[ x0 ][ y0 ] | ae(v) |
| if ( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) ) | |
| **intra_subpartitions_mode_flag**[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| **intra_subpartitions_split_flag**[ x0 ][ y0 ] | ae(v) |
| if ( dimd_flag[ x0 ][ y0 ] == 0) { | |
| if( intra_luma_ref_idx[ x0 ][ y0 ] = = 0 && intra_subpartitions_mode_flag[ x0 ][ y0 ] = = 0 ) | |
| **intra_luma_mpm_flag**[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| **intra_luma_not_planar_flag**[ x0 ][ y0 ] | ae(v) |
| if( intra_luma_not_planar_flag[ x0 ][ y0 ] ) | |
| **intra_luma_mpm_idx**[ x0 ][ y0 ] | ae(v) |
| } else | |
| **intra_luma_mpm_remainder**[ x0 ][ y0 ] | ae(v) |
| } | |
| } | |
| } | |
| } | |
| if( treeType = = SINGLE_TREE \|\| treeType = = DUAL_TREE_CHROMA ) | |
| **intra_chroma_pred_mode**[ x0 ][ y0 ] | ae(v) |
| } | |
| } | |
| ... | |
| } | |

| | | |
|---|---|---|
| 1 | 0 | −1 |
| 2 | 0 | −2 |
| 1 | 0 | −1 |

(b)

| | | |
|---|---|---|
| −1 | −2 | −1 |
| 0 | 0 | 0 |
| 1 | 2 | 1 |

(c)

| | | |
|---|---|---|
| −1 | 0 | 1 |
| −2 | 0 | 2 |
| −1 | 0 | 1 |

(d)

| | | |
|---|---|---|
| 1 | 2 | 1 |
| 0 | 0 | 0 |
| −1 | −2 | −1 |

| signx | signy | xgty | region |
|---|---|---|---|
| 0 | 0 | 0 | Rd |
| 0 | 1 | 0 | Rc |
| 1 | 0 | 0 | Rc |
| 1 | 1 | 0 | Rd |
| 0 | 0 | 1 | Ra |
| 0 | 1 | 1 | Rb |
| 1 | 0 | 1 | Rb |
| 1 | 1 | 1 | Ra |

(b)

VIDEO DECODING APPARATUS, VIDEO CODING APPARATUS, AND ANGULAR MODE DERIVATION APPARATUS

TECHNICAL FIELD

An embodiment of the present invention relates to a video decoding apparatus, a video coding apparatus, and an angular mode derivation apparatus. This application claims priority based on Japanese Patent Application No. 2022-90076 filed on Jun. 2, 2022 and Japanese Patent Application No. 2022-96934 filed on Jun. 16, 2022, the contents of which are incorporated herein by reference.

BACKGROUND ART

A video coding apparatus which generates coded data by coding a video, and a video decoding apparatus which generates decoded images by decoding coded data are used for efficient transmission or recording of videos.

For example, specific video coding schemes include schemes proposed in, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such a video coding scheme, usually, a prediction image is generated based on a locally decoded image that is obtained by coding/decoding an input image, and a prediction error (which may be referred to also as a “difference image” or a “residual image”) obtained by subtracting the prediction image from the input image (source image) is coded. Generation methods of prediction images include inter picture prediction (inter prediction) and intra picture prediction (intra prediction).

In addition, NPL 1 introduces an example of recent techniques for video coding and decoding. NPL 1 discloses Decoder-side Intra Mode Derivation (DIMD) prediction, in which a decoder derives an intra directional prediction mode number using pixels in a neighboring region and thereby derives a prediction image.

CITATION LIST

Non Patent Literature

NPL 1: M. Abdoli, T. Guionnet, E. Mora, et. al, “Non-CE3: Decoder-side Intra Mode Derivation with Prediction Fusion Using Planar”, JVET-O0449, Gothenburg, July 2019.

SUMMARY OF INVENTION

Technical Problem

In the angular mode derivation as in NPL 1, the angular mode used for decoder-side intra mode derivation is inferred using gradients of pixel values in a target region. In this case, comparison of a magnitude relationship is repeatedly performed to convert the direction of the gradients into the angular mode, and thus there is a problem that the amount of processing increases. The derivation of the angle ratio of the gradients and the convert from the angle ratio to the angular mode are performed in two stages, and thus usage of processing is increased.

The present invention has an object to perform suitable angular mode derivation without increasing the amount of processing for deriving an angular mode from gradients in angular mode derivation.

Solution to Problem

In order to solve the problem described above, an angular mode derivation apparatus according to an aspect of the present invention includes: a gradient derivation unit configured to derive a first gradient being a gradient of a pixel value included in a gradient derivation target image; and an angular mode derivation unit configured to derive an angular mode, using the first gradient, a second gradient different from the first gradient, and two prescribed tables.

In the angular mode derivation apparatus, a first value may be derived with reference to a first table by using a value derived using a shift based on a logarithm value of a gradient in a first pixel, and the angular mode may be derived with reference to a second table by using the first value and an index obtained by the shift based on the logarithm value.

In the angular mode derivation apparatus, the first value may be derived with reference to the first table by using the value derived using the shift based on the logarithm value of the first gradient in a second pixel, and the angular mode may be derived with reference to the second table by using a product of the first value and the second gradient and the index obtained by the shift based on the logarithm value of the first gradient.

The angular mode derivation apparatus may include an angular mode selection unit configured to select an angular mode representative value from multiple angular modes derived in a pixel in the gradient derivation target image.

Elements of the table may be integers of 0 or greater.

The elements of the table may be the integers of 0 or greater and values in ascending order, and the number of the elements having a same value may have an increasing relationship except for a last element.

The angular mode selection unit may select the angular mode representative value, using an average value of the angular mode.

A video decoding apparatus according to an aspect of the present invention includes: the angular mode derivation apparatus; and a prediction image derivation unit configured to derive a prediction image, based on an intra prediction mode derived by adding the angular mode derived from a table and a reference mode, with a gradient derivation target image being a top and left neighboring region of a target block.

The video decoding apparatus may include an inverse transform processing unit configured to perform inverse transform of a transform coefficient, using a transform matrix derived based on the angular mode.

A video coding apparatus according to an aspect of the present invention includes: the angular mode derivation apparatus; and a prediction image derivation unit configured to derive a prediction image, based on an intra prediction mode derived by adding the angular mode derived from a table and a reference mode, with a gradient derivation target image being a top and left neighboring region of a target block.

Advantageous Effects of Invention

According to an aspect of the present invention, it is possible to perform suitable intra prediction without increasing the amount of calculation of decoder-side intra mode derivation.

BRIEF DESCRIPTION OF DRAWINGS

FIG. 7 is a syntax example of DIMD.

FIG. 8 is examples of spatial filters.

DESCRIPTION OF EMBODIMENTS

First Embodiment

Embodiments of the present invention will be described below with reference to the drawings.

Figure 1:
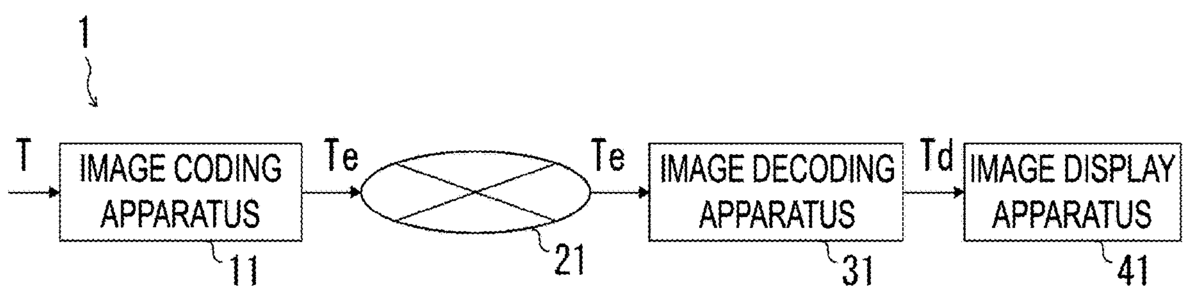
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting, or the like. In addition, the network 21 may be replaced by a storage medium on which the coding stream Te is recorded, such as a Digital Versatile Disc (DVD) (trade name) or a Blu-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include stationary, mobile, and HMD. In addition, in a case that the video decoding apparatus 31 has a high processing capability, an image having high image quality is displayed, and in a case that the video decoding apparatus has a lower processing capability, an image which does not require high processing capability and display capability is displayed.

Operators

Operators used in the present specification will be described below.

>> indicates a right bit shift, << indicates a left bit shift, & indicates a bitwise AND, | indicates a bitwise OR, ^ indicates a bitwise XOR, |= indicates an OR assignment operator, ! indicates a logical negation (NOT), && indicates a logical product (AND), and || indicates a logical sum (OR).

x ? y: zis a ternary operator that takes y in a case that x is true (other than 0) and takes z in a case that x is false (0).

Clip3 (a, b, c) is a function to clip c to a value equal to or greater than a and less than or equal to b, and a function to return a in a case that c is less than a (c<a), return b in a case that c is greater than b (c>b), and return c in other cases (provided that a is less than or equal to b (a<=b)).

Clip1Y (c) is an operator set to a=0 and b=(1<<BitDepthY)−1 in Clip3 (a, b, c). BitDepthY is a luma bit depth.

abs(a) is a function that returns the absolute value of a.

Int(a) is a function that returns the integer value of a.

Floor (a) is a function that returns the maximum integer equal to or less than a.

Log 2(a) is a function that returns a logarithm to base 2.

Ceil(a) is a function that returns the minimum integer equal to or greater than a.

a/d represents division of a by d (round down decimal places).

Min(a) is a function that returns the smaller value between a and b.

Structure of Encoding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
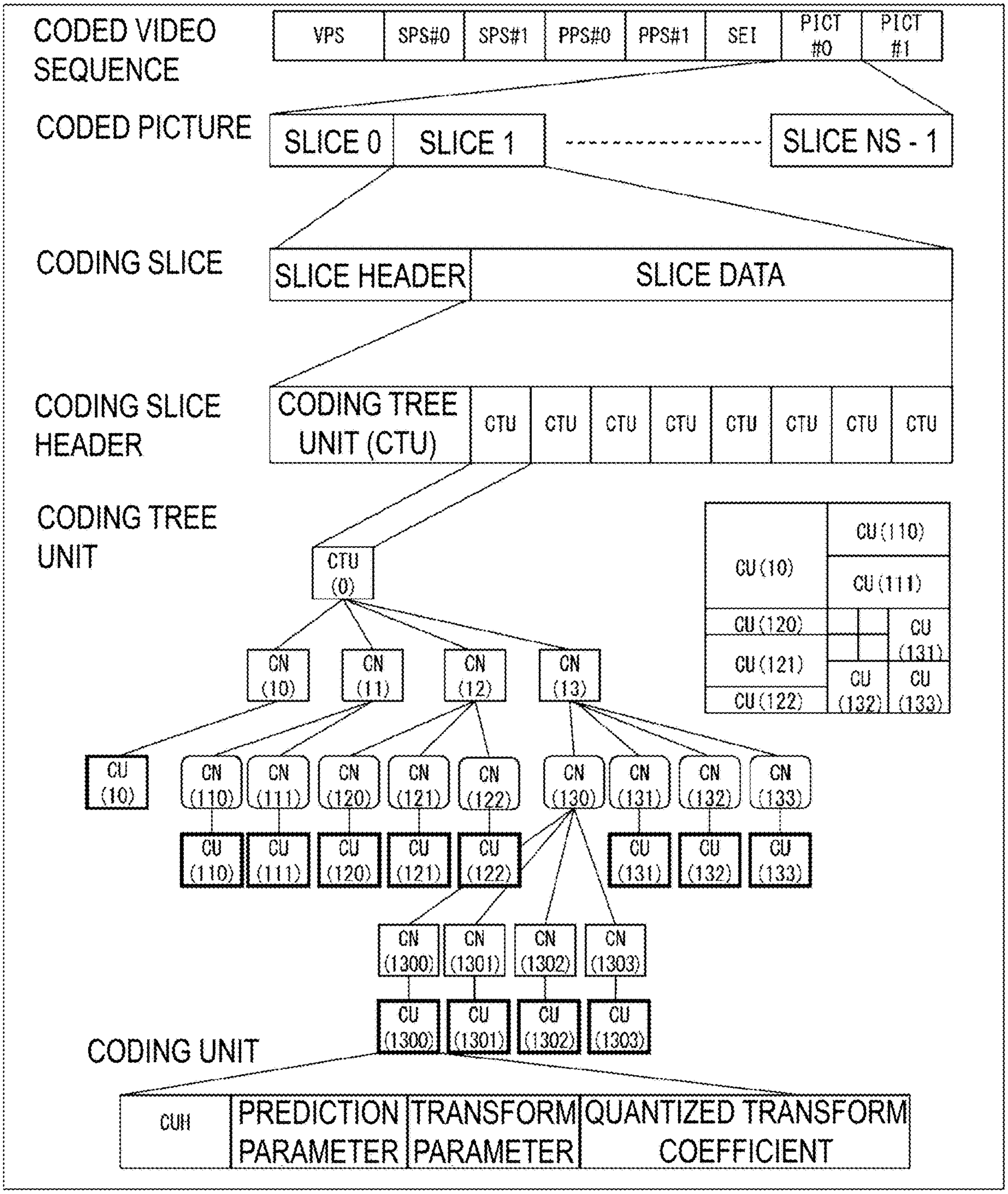
FIG. 2 is a diagram illustrating a hierarchical structure of data of a coding stream.

FIG. 2 is a diagram illustrating a hierarchical structure of data of the encoding stream Te. The coding stream Te includes, as an example, a sequence and multiple pictures constituting the sequence. FIG. 2 illustrates a coded video sequence that defines a sequence SEQ, a coded picture that defines a picture PICT, a coding slice that defines a slice S, coding slice data that defines slice data, coding tree units included in coding slice data, and coding units included in each coding tree unit.

Coded Video Sequence

In the coded video sequence, a set of data referred to by the video decoding apparatus 31 to decode a sequence SEQ to be processed is defined. As illustrated in the coded video sequence of FIG. 2, the sequence SEQ includes a Video Parameter Set (VPS), Sequence Parameter Sets (SPSs), Picture Parameter Sets (PPSs), pictures PICT, and Supplemental Enhancement Information (SEI).

The video parameter set VPS defines, in a video including multiple layers, a set of coding parameters common to multiple video images and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence is defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. As illustrated in the coded picture of FIG. 2, a picture PICT includes slices 0 to NS−1 (where NS is the total number of slices included in the picture PICT).

Note that, in a case that it is not necessary to distinguish each of the slice 0 to the slice NS−1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. Each slice includes a slice header and slice data as illustrated in the coding slice of FIG. 2.

The slice header includes a coding parameter group referred to by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) an I slice for which only intra prediction is used for coding, (2) a P slice for which unidirectional prediction or intra prediction is used for coding, (3) a B slice for which unidirectional prediction, bidirectional prediction, or intra prediction is used for coding. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the video decoding apparatus 31 to decode slice data to be processed is defined. Slice data includes CTUs as illustrated in the coding slice header of FIG. 2. A CTU is a block in a fixed size (for example, 64×64) constituting a slice, and may also be called a Largest Coding Unit (LCU).

Coding Tree Unit

In the coding tree unit of FIG. 2, a set of data that is referred to by the video decoding apparatus 31 to decode the CTU to be processed is defined. A CTU is split into coding units CU which are basic coding processing units through recursive Quad Tree (QT) splitting, Binary Tree (BT) splitting, or Ternary Tree (TT) splitting. The BT split and the TT split are collectively referred to as Multi Tree (MT) split. A node of a tree structure obtained by recursive quad tree split is referred to as a Coding Node. An intermediate node of a quad tree, a binary tree, and a ternary tree is a coding node, and a CTU itself is also defined as the highest coding node.

Coding Unit

As illustrated in the coding unit of FIG. 2, a set of data referred to by the video decoding apparatus 31 to decode the coding unit to be processed is defined. Specifically, a CU includes a CU header CUH, a prediction parameter, a transform parameter, a quantized transform coefficient, and the like. In the CU header, a prediction mode and the like are defined.

The prediction processing may be performed for each CU or performed for each sub-CU, the sub-CU being obtained by further splitting the CU. In a case that a CU and a sub-CU have an equal size, the number of sub-CUs in the CU is one. In a case that a CU is larger in size than a sub-CU, the CU is split into sub-CUs. For example, in a case that the CU has a size of 8×8, and the sub-CU has a size of 4×4, the CU is split into four sub-CUs including two sub-CUs split horizontally and two sub-CUs split vertically.

There are two types of predictions (prediction modes), which are intra prediction and inter prediction. Intra prediction refers to prediction in the same picture, and inter prediction refers to prediction processing performed between different pictures (for example, between pictures of different display times, and between pictures of different layer images).

Although transform and quantization processing is performed for each CU, entropy coding of a quantized transform coefficient may be performed for each subblock such as 4×4.

Prediction Parameters

A prediction image is derived by prediction parameters associated with blocks. The prediction parameters include intra prediction and inter prediction parameters.

Figure 3:
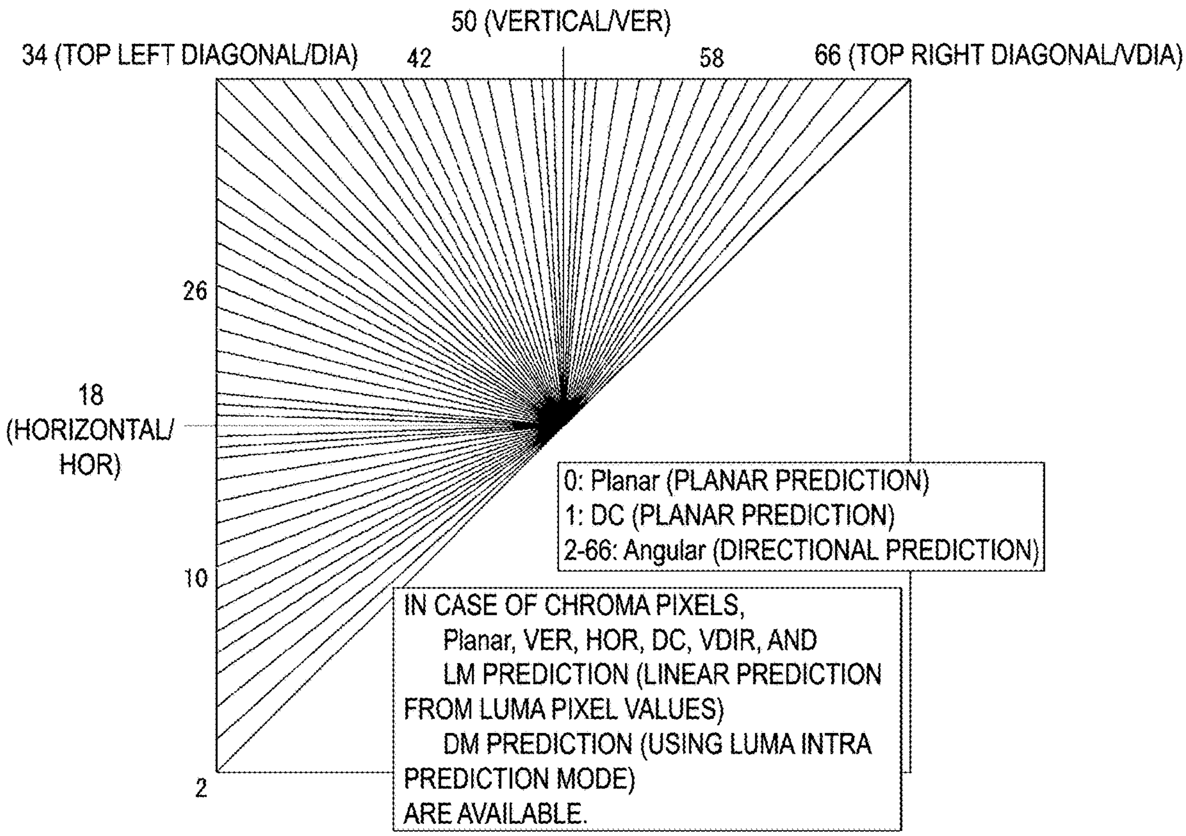
FIG. 3 is a schematic diagram illustrating types (mode numbers) of intra prediction modes.

The prediction parameters for intra prediction will be described below. The intra prediction parameters include a luma prediction mode IntraPredModeY and a chroma prediction mode IntraPredModeC. FIG. 3 is a schematic diagram illustrating types (mode numbers) of intra prediction modes. There are 67 types (0 to 66) of intra prediction modes, for example, as illustrated in the drawing. For example, there are planar prediction (0), DC prediction (1), and angular prediction (2 to 66). In addition, Linear Model (LM) prediction may be used, such as Cross Component Linear Model (CCLM) prediction and Multi Mode Linear Model (MMLM) prediction. Furthermore, for chroma, an LM mode may be added.

Configuration of Video Decoding Apparatus

Figure 4:
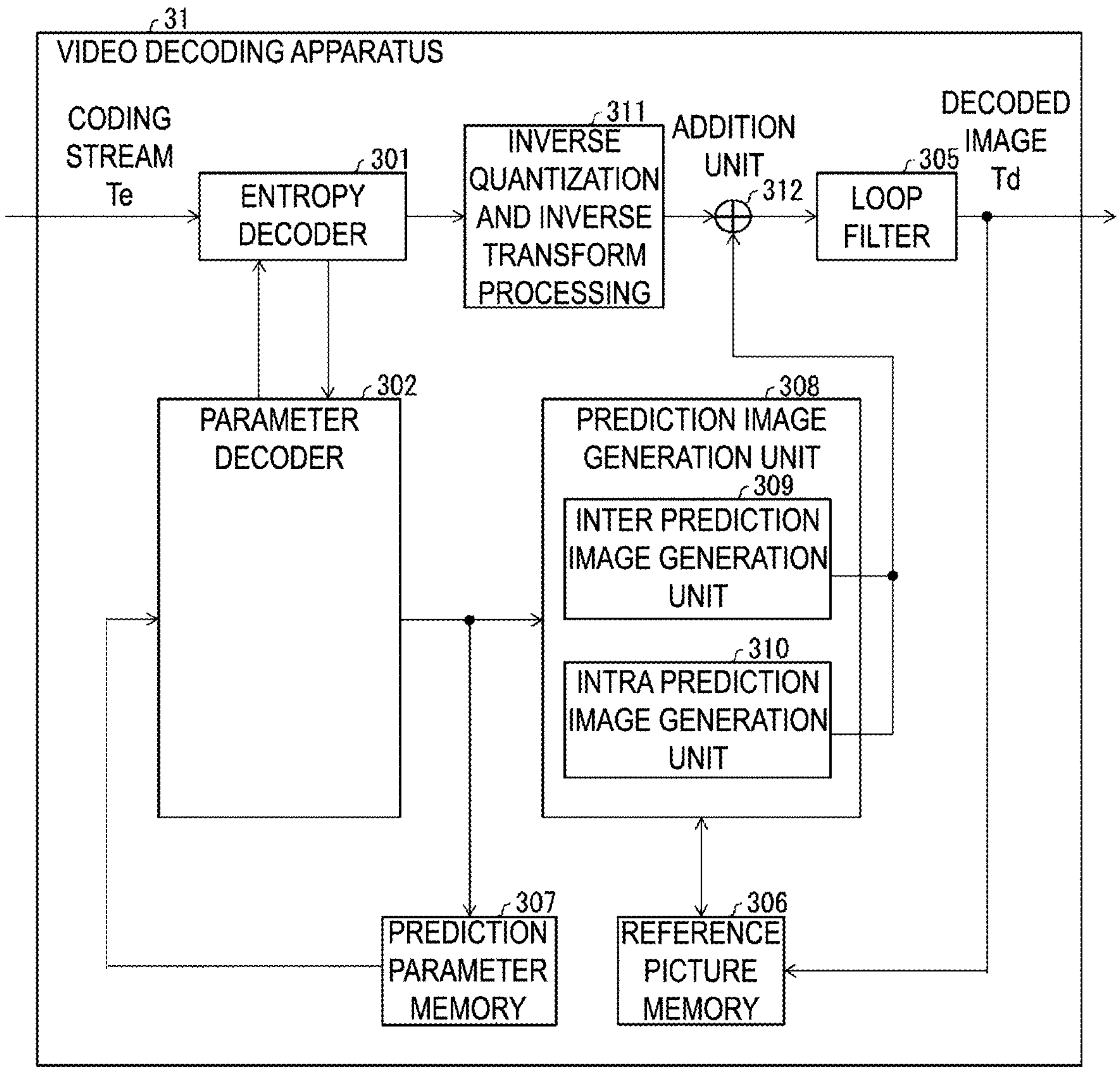
FIG. 4 is a schematic diagram illustrating a configuration of a video decoding apparatus.

A configuration of the video decoding apparatus 31 (FIG. 4) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that a configuration in which the loop filter 305 is not included in the video decoding apparatus 31 may be used in accordance with the video coding apparatus 11 described below.

In addition, the parameter decoder 302 includes an inter prediction parameter decoder 303 and an intra prediction parameter decoder 304 which are not illustrated. The prediction image generation unit 308 includes an inter prediction image generation unit 309 and an intra prediction image generation unit 310.

In addition, although an example in which CTU and CU are used as a unit of processing will be described below, the unit of processing is not limited to this example, and processing may be performed for each sub-CU. Alternatively, the CTU and the CU may be interpreted as a block and the sub-CU as a subblock, and processing may be performed in units of blocks or subblocks.

The entropy decoder 301 performs entropy decoding on the coding stream Te input from the outside and separates and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or calculation expression. In the former Context Adaptive Binary Arithmetic Coding (CABAC), probability models updated for each coded or decoded picture (slice) are stored in a memory. Then, as the initial state of the context of a P picture or a B picture, the probability model of a picture using quantization parameters of the same slice type and the same slice level is configured out of the probability models stored in the memory. The initial state is used for coding and decoding processing. The separated codes include prediction information to generate a prediction image, a prediction error to generate a difference image, and the like.

The entropy decoder 301 outputs the separated codes to the parameter decoder 302. Which code is to be decoded is controlled based on an indication of the parameter decoder 302.

Configuration of Intra Prediction Parameter Decoder 304

The intra prediction parameter decoder 304 decodes an intra prediction parameter, for example, an intra prediction mode IntraPredMode, with reference to the prediction parameters stored in the prediction parameter memory 307 based on codes input from the entropy decoder 301. The intra prediction parameter decoder 304 outputs the decoded intra prediction parameter to the prediction image generation unit 308, and also stores the decoded intra prediction parameter in the prediction parameter memory 307. The intra prediction parameter decoder 304 may derive different intra prediction modes depending on luminance and chrominance.

The intra prediction parameter decoder 304 decodes syntax elements related to the intra prediction as illustrated in FIG. 7.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

The prediction mode predMode, the prediction parameter, and the like are input to the prediction image generation unit 308. In addition, the prediction image generation unit 308 reads out a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Intra Prediction Image Generation Unit 310

In a case that the prediction mode predMode indicates an intra prediction mode, the intra prediction image generation unit 310 performs intra prediction by using an intra prediction parameter input from the intra prediction parameter decoder 304 and a reference pixel read out from the reference picture memory 306.

Specifically, the intra prediction image generation unit 310 reads, from the reference picture memory 306, neighboring blocks located on a target picture within a prescribed range from a target block. The prescribed range corresponds to left, upper left, upper, and upper right neighboring blocks of the target block, and reference areas vary depending on the intra prediction mode.

The intra prediction image generation unit 310 refers to read decoded pixel values and the prediction mode indicated by IntraPredMode to generate a prediction image of the target block. The intra prediction image generation unit 310 outputs the generated prediction image of the block to the addition unit 312.

The generation of a prediction image based on the intra prediction mode will be described below. In Planar prediction, DC prediction, and Angular prediction, a decoded peripheral region adjacent to (proximate to) a prediction target block is configured as a reference region R. Then, the pixels on the reference region R are extrapolated in a particular direction to generate the prediction image. For example, the reference region R may be configured as an L-shaped region including left and upper regions (or further upper left, upper right, and lower left regions) of the prediction target block.

Details of Prediction Image Generation Unit

Figure 5:
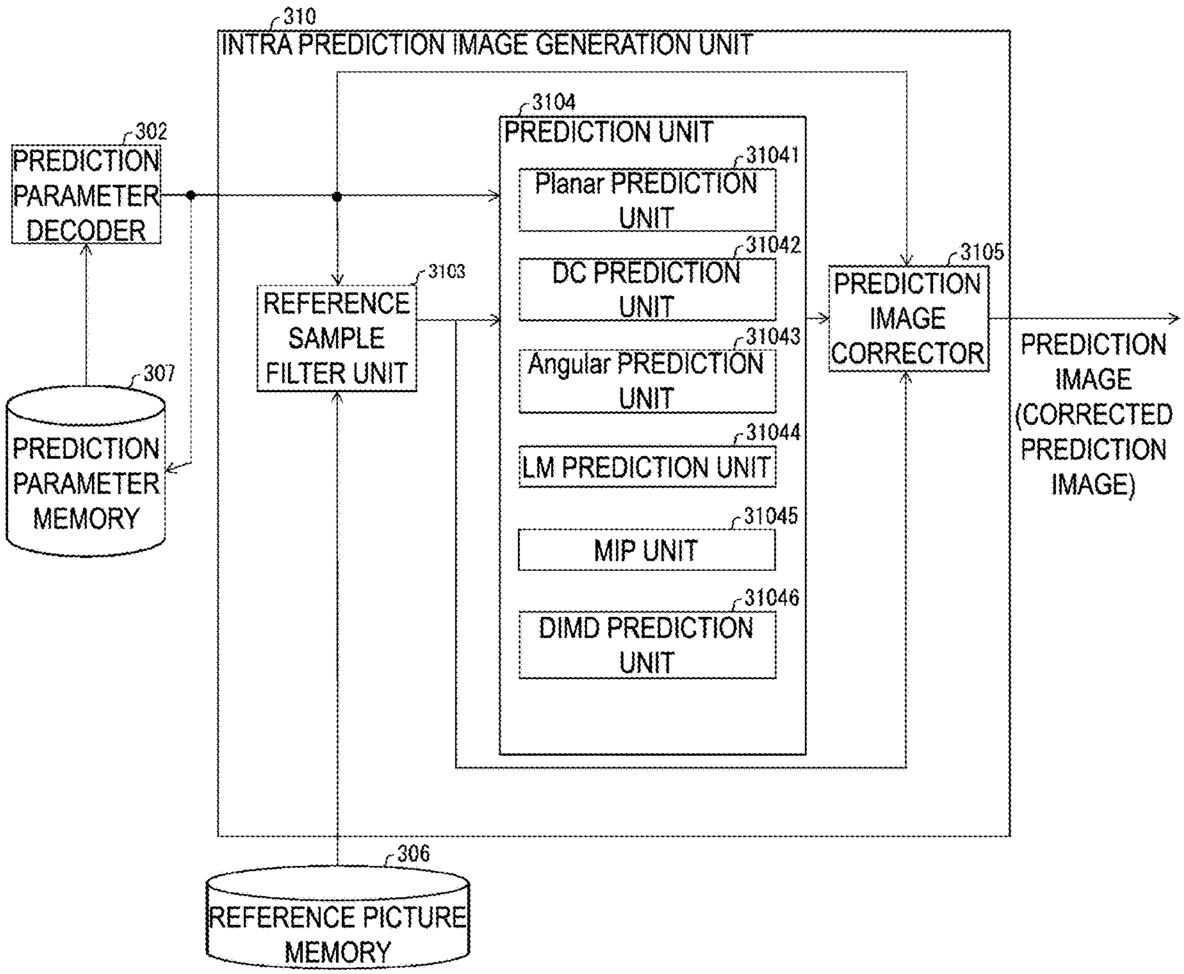
FIG. 5 is a diagram illustrating a configuration of an intra prediction image generation unit.

Next, a configuration of the intra prediction image generation unit 310 will be described in detail with reference to FIG. 5. The intra prediction image generation unit 310 includes a reference sample filter unit 3103 (second reference image configuration unit), a prediction unit 3104, and a prediction image corrector 3105 (a prediction image corrector, a filter switching unit, and a weighting factor change unit).

The prediction unit 3104 generates a prediction image (a tentative prediction image, a pre-correction prediction image) of the prediction target block and outputs the prediction image to the prediction image corrector 3105, based on each reference pixel (reference image) on the reference region R, the filtered reference image generated by applying the reference pixel filter (first filter), and the intra prediction mode. The prediction image corrector 3105 corrects the tentative prediction image according to the intra prediction mode, generates a prediction image (corrected prediction image), and outputs the prediction image.

Each part included in the intra prediction image generation unit 310 will be described below.

Reference Sample Filter Unit 3103

The reference sample filter unit 3103 derives a reference sample s[x][y] at each position (x, y) on the reference region R with reference to the reference image. In addition, the reference sample filter unit 3103 applies the reference pixel filter (first filter) to the reference sample s[x][y] according to the intra prediction mode to update the reference sample s[x][y] at each position (x, y) on the reference region R (derives a filtered reference image s[x][y]). Specifically, a low-pass filter is applied to the position (x, y) and the reference image in the vicinity thereof to derive a filtered reference image. Note that it is not always necessary to apply the low-pass filter to all the intra prediction modes, and the low-pass filter may be applied to some of the intra prediction modes. Note that, while the filter applied to the reference image on the reference region R by the reference sample filter unit 3103 is referred to as a "reference pixel filter (first filter)", the filter for correcting the tentative prediction image by the prediction image corrector 3105 described below is referred to as a "position-dependent filter (second filter)".

Configuration of Intra Prediction Unit 3104

The intra prediction unit 3104 generates a tentative prediction image (tentative prediction pixel value or pre-corrected prediction image) of the prediction target block based on the intra prediction mode, the reference image, and the filtered reference pixel value, and outputs the tentative prediction image to the prediction image corrector 3105. The prediction unit 3104 includes a Planar prediction unit 31041, a DC prediction unit 31042, an Angular prediction unit 31043, an LM prediction unit 31044, a Matrix-based Intra Prediction (MIP) unit 31045, and a DIMD prediction unit 31046 (DIMD (Decoder-side Intra Mode Derivation)). The prediction unit 3104 selects a specific prediction unit according to the intra prediction mode, and inputs the reference image and the filtered reference image. The relationship between the intra prediction mode and the corresponding prediction unit is as follows.

Planar prediction: Planar prediction unit 31041

DC prediction: DC prediction unit 31042

Angular prediction: Angular prediction unit 31043

LM prediction: LM prediction unit 31044

Matrix intra prediction: MIP unit 31045

DIMD prediction: DIMD prediction unit 31046

Planar Prediction

The planar prediction unit 31041 generates a tentative prediction image by linearly adding reference samples s[x][y] together in accordance with the distance between a prediction target pixel position and a reference pixel position, and outputs the tentative prediction image to the prediction image corrector 3105.

DC Prediction

The DC prediction unit 31042 derives a DC prediction value corresponding to the average value of the reference samples s[x][y] and outputs a tentative prediction image q[x][y] having the DC prediction value as a pixel value.

Angular Prediction

The angular prediction unit 31043 generates a tentative prediction image q[x][y] using the reference samples s[x][y] in the prediction direction (reference direction) indicated by the intra prediction mode, and outputs the tentative prediction image to the prediction image corrector 3105.

LM Prediction

The LM prediction unit 31044 predicts a chroma pixel value based on a luma pixel value. Specifically, this is a scheme in which a prediction image of a chroma image (Cb, Cr) is generated by using a linear model based on a decoded luma image. One of LM predictions is Cross-Component Linear Model (CCLM) prediction. CCLM prediction is a prediction scheme using a linear model for predicting chrominance from luminance for one block.

Matrix Intra Prediction

The MIP unit 31045 generates a tentative prediction image q[x][y] using product-sum operation on the reference sample s[x][y] derived from a neighboring region and a weight matrix, and outputs the tentative prediction image q[x][y] to the prediction image corrector 3105.

DIMD Prediction

The DIMD prediction unit 31046 employs a prediction scheme of generating a prediction image using the intra prediction mode that is not explicitly signaled. The intra prediction parameter decoder 304 derives the intra prediction mode suitable for the target block using information of the neighboring region in the angular mode derivation apparatus 310465, and the DIMD prediction unit 31046 generates a prediction image using the intra prediction mode. Details will be described below.

Configuration of Prediction Image Corrector 3105

The prediction image corrector 3105 corrects the tentative prediction image output from the prediction unit 3104 according to the intra prediction mode. Specifically, the prediction image corrector 3105 derives a weighting factor depending on a position for each pixel of the tentative prediction image in accordance with the positions of the reference region R and the target prediction pixel. Then, the reference sample s[ ][ ] and the tentative prediction image q[x][y] are subjected to weighted addition (weighted average) to derive a prediction image (corrected prediction image) Pred[ ][ ] obtained by correcting the tentative prediction image. Note that, in some intra prediction modes, the prediction image may be set without correcting the tentative prediction image q[x][y] in the prediction image corrector 3105.

Example 1

Figure 6:
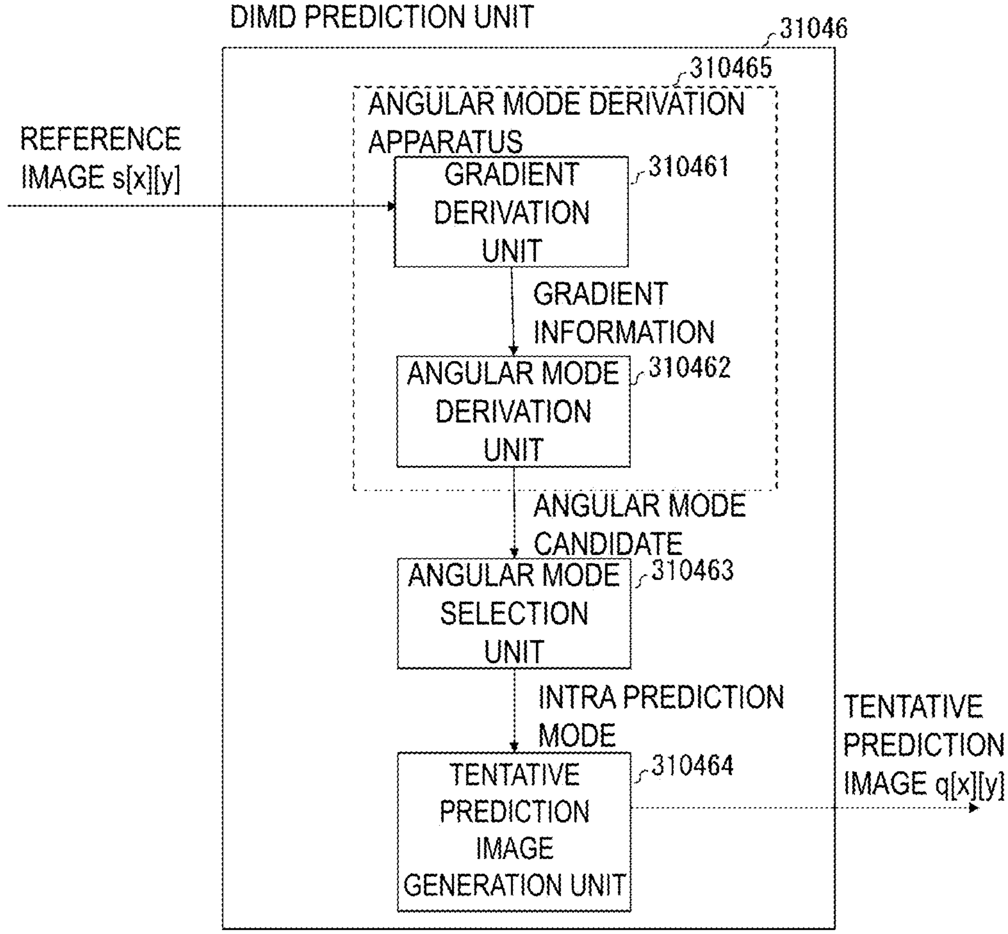
FIG. 6 is a diagram illustrating details of a DIMD prediction unit.

FIG. 6 illustrates a configuration of the DIMD prediction unit 31046 according to the present embodiment. The DIMD prediction unit 31046 includes an angular mode derivation apparatus 310465 (a gradient derivation unit 310461 and an angular mode derivation unit 310462), an angular mode selection unit 310463, and a tentative prediction image generation unit 310464. The angular mode derivation apparatus 310465 may include the angular mode selection unit 310463.

FIG. 7 illustrates a syntax example of coded data related to DIMD. The intra prediction parameter decoder 304 decodes a flag dimd_flag indicating whether to use DIMD for each block from coded data. In a case that dimd_flag is 1, the parameter decoder 302 need not decode a syntax element related to the intra prediction mode (for example, a flag intra_mip_flag indicating whether to perform MIP prediction, a flag intra_luma_mpm_flag indicating whether to use a prediction candidate Most Probable Mode (MPM), an index intra_luma_mpm_idx indicating the MPM in a case of using the MPM, and an index intra_luma_mpm_reminder for selecting the rest of the candidates in a case of not using MPM) from the coded data. In a case that dimd_flag is 0, intra_luma_mpm_flag is decoded, and in a case that intra_luma_mpm_flag is 0, intra_luma_mpm_remainer is further decoded. In a case that intra_luma_mpm_flag is 1, intra_luma_not_planar_flag and intra_luma_mpm_idx are decoded.

In a case that dimd_flag is 1, the DIMD prediction unit 31046 derives an angle indicating a texture direction in a neighboring region, using pixel values. Then, a tentative prediction image is generated using the intra prediction mode corresponding to the angle. For example, (1) the gradient direction of pixel values is derived regarding pixels at a prescribed position in the neighboring region. (2) The derived gradient direction is converted into a corresponding directional prediction mode (Angular prediction mode). (3) A histogram of each obtained prediction direction is created for each prescribed pixel in the neighboring region. (4) A prediction mode of the most frequent value or multiple prediction modes including the most frequent value is selected from the histogram, and a tentative prediction image is generated using the prediction mode(s). Processing in each unit of the DIMD prediction unit 31046 illustrated in FIG. 6 will be described below in further detail.

(1) Gradient Derivation Unit

The gradient derivation unit 310461 derives an angle (angle information) indicating a texture direction, based on image data of a gradient derivation target image. The angle information may be a value representing an angle with 1/36 accuracy, or may be another value. The gradient derivation unit 310461 derives gradients (for example, Dx and Dy) in two or more specific directions, and derives the direction (angle information) of the gradients from the relationship between the gradients Dx and Dy.

Figure 9:
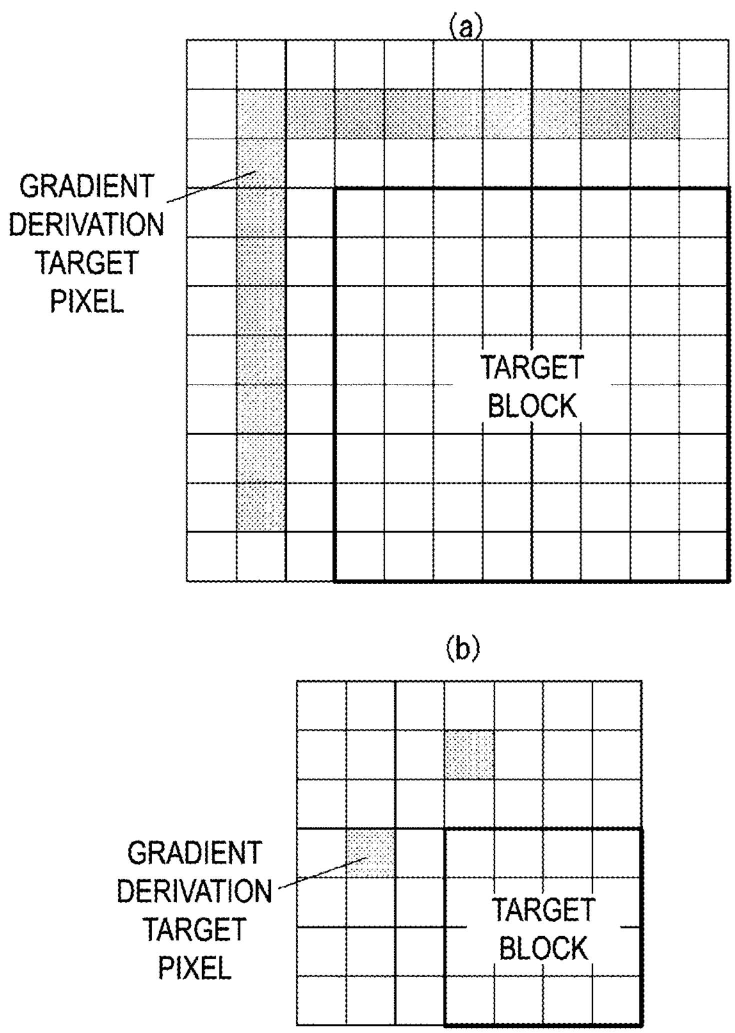
FIG. 9 is a diagram illustrating an example of gradient derivation target pixels.

In derivation of the gradients, a spatial filter may be used. As the spatial filter, 3×3 pixel Sobel filters corresponding to the horizontal direction and the vertical direction as illustrated in FIGS. 8(*a*) and 8(*b*) may be used, for example. The gradient derivation unit 310461 derives the gradients of points Pn[0][0] (n=0, . . . , N−1) at N gradient derivation target positions in the gradient derivation target image. FIG. 9(*a*) illustrates an example of the positions of the gradient derivation target pixels in a target block having 8×8 pixels. FIG. 9(*b*) illustrates an example of the positions of the gradient derivation target pixels in a target block having 4×4 pixels. In a case that the angular mode derivation apparatus 310465 is used for the intra prediction, a hatched image located in the neighboring region of the target block may be the gradient derivation target image. The gradient derivation target image may be a luma image corresponding to a chroma image of the target block. In this manner, depending on information such as the size of the target block and the prediction mode of the block included in the neighboring region, the number of gradient derivation target pixels, the pattern of the positions, a range of reference of the spatial filter may be changed.

Specifically, the gradient derivation unit 310461 derives the gradients Dx and Dy of the horizontal direction and the vertical direction as in the following expressions regarding each point Pn.

$$Dx = Pn[-1][-1] + 2*Pn[-1][0] + Pn[-1][1] - Pn[1][-1] - 2*Pn[1][0] - Pn[1][1]$$

$$Dy = -Pn[-1][-1] - 2*Pn[0][-1] - Pn[1][-1] + Pn[-1][1] + 2*Pn[0][1] + Pn[1][1]$$

Here, Pn[x][y] is a pixel value in a pixel represented using relative coordinates with respect to the point Pn ([0][0]) at the gradient derivation target position. Filters of FIGS. 8(*c*) and 8(*d*) may be used, which are obtained by horizontally or vertically flipping the filters of FIGS. 8(*a*) and 8(*b*). In that case, Dx and Dy are derived using the following expressions.

$$Dx = -Pn[-1][-1] - 2*Pn[-1][0] - Pn[-1][1] + Pn[1][-1] + 2*Pn[1][0] + Pn[1][1]$$

$$Dy = Pn[-1][-1] + 2*Pn[0][-1] + Pn[1][-1] - Pn[-1][1] - 2*Pn[0][1] - Pn[1][1]$$

The method of deriving the gradients is not limited to this, and another method (a filter, a calculation expression, a table, or the like) may be used. For example, in place of the Sobel filter, a Prewitt filter, a Scharr filter, or the like may be used, or the filter size may be changed to 2×2 or 5×5. The gradient derivation unit 310461 derives Dx and Dy as follows, using the Prewitt filter.

$$Dx = Pn[-1][-1] + Pn[-1][0] + Pn[-1][1] - Pn[1][-1] - Pn[1][0] - Pn[1][1]$$

$$Dy = -Pn[-1][-1] - Pn[0][-1] - Pn[1][-1] + Pn[-1][1] + Pn[0][1] + Pn[1][1]$$

The following expressions are an example of deriving Dx and Dy using the Scharr filter.

$$Dx = 3*Pn[-1][-1] + 10*Pn[-1][0] + 3*Pn[-1][1] - 3*Pn[1][-1] - 10*Pn[1][0] - 3*Pn[1][1]$$

$$Dy = -3*Pn[-1][-1] - 10*Pn[0][-1] - 3*Pn[1][-1] + 3*Pn[-1][1] + 10*Pn[0][1] + 3*Pn[1][1]$$

The method of deriving the gradients may be changed for each block. For example, the Sobel filter is used for the target block having 4×4 pixels, and the Scharr filter is used for a block larger than 4×4. Using a filter with simpler calculation for a small block as described above can moderate increase in the amount of calculation in the small block.

The method of deriving the gradients may be changed for each position of the gradient derivation target pixel. For example, the Sobel filter is used for the gradient derivation target pixel located in the top or left neighboring region, and the Scharr filter is used for the gradient derivation target pixel located in the top left neighboring region.

The gradient derivation unit 310461 derives angle information including an orthant (a quadrant; hereinafter expressed as a region) of the angle of the texture of the target block and the angle in the orthant, based on signs and a magnitude relationship of Dx and Dy. By using regions, it becomes possible to commonly handle directions that have rotational symmetry or line symmetry. Note that the angle information is not limited to the angle in the region and the orthant. For example, it may be information of only the angle, and the region may be derived as necessary. In the present embodiment, the intra directional prediction mode derived in the following is limited to directions from the bottom left to the top right (2 to 66 in FIG. 3), and the intra directional prediction mode in directions that is rotationally symmetrical by 180-degree is handled in the same manner.

Figure 10:
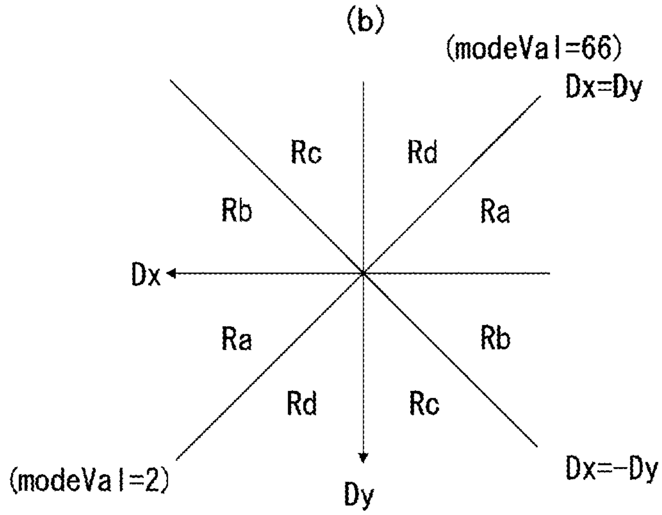
FIG. 10 is a diagram illustrating a relationship between gradients and regions.

FIG. 10(*a*) is a table illustrating a relationship between the signs (signx, signy) of Dx and Dy, the magnitude relationship (xgty), and the region (each of Ra to Rd is a constant representing the region). FIG. 10(*b*) illustrates the orthants indicated by the regions Ra to Rd. The gradient derivation unit 310461 derives signx, signy, and xgty as follows.

$$absx = \mathrm{abs}\,(Dx)$$

$$absy = \mathrm{abs}\,(Dy)$$

$$signx = Dx < 0\ ?\ 1{:}0$$

$$signy = Dy < 0\ ?\ 1{:}0$$

$$xgty = absx > absy\ ?\ 1{:}0$$

Here, inequality symbols (> and <) may be provided with equality symbols (>= and <=). The region indicates a rough angle, and can be derived only from the signs signx and signy of Dx and Dy and the magnitude relationship xgty.

The gradient derivation unit is 310461 derives region from the signs, signx and signy and the magnitude relationship xgty, using calculation and table reference. The gradient derivation unit may refer to the table of FIG. 10(*a*), and derive corresponding region.

The gradient derivation unit 310461 may derive region as follows, using a logical expression.

$$\mathrm{region} = xgty\ ?\ \big((signx \wedge signy)\ ?\ 1{:}0\big) : \big((signx \wedge signy)\ ?\ 2{:}3\big)$$

Here, "^" indicates XOR (exclusive or). region is indicated by a value from 0 to 3. {Ra, Rb, Rc, Rd}={0, 1, 2, 3}. Note that the method of assigning the values of region is not limited to the above.

The gradient derivation unit 310461 may derive region as follows, using another logical expression and addition and multiplication.

$$\mathrm{region} = 2 * (!\, xgty) + (signx \wedge signy \wedge !\, xgty)$$

Here, the symbol "!" means a logical "not".

(2) Angular Mode Derivation Unit

The angular mode derivation unit 310462 derives the angular mode (the prediction mode corresponding to the gradients, for example, the intra prediction mode), based on gradient information of the points Pn.

Figure 12:
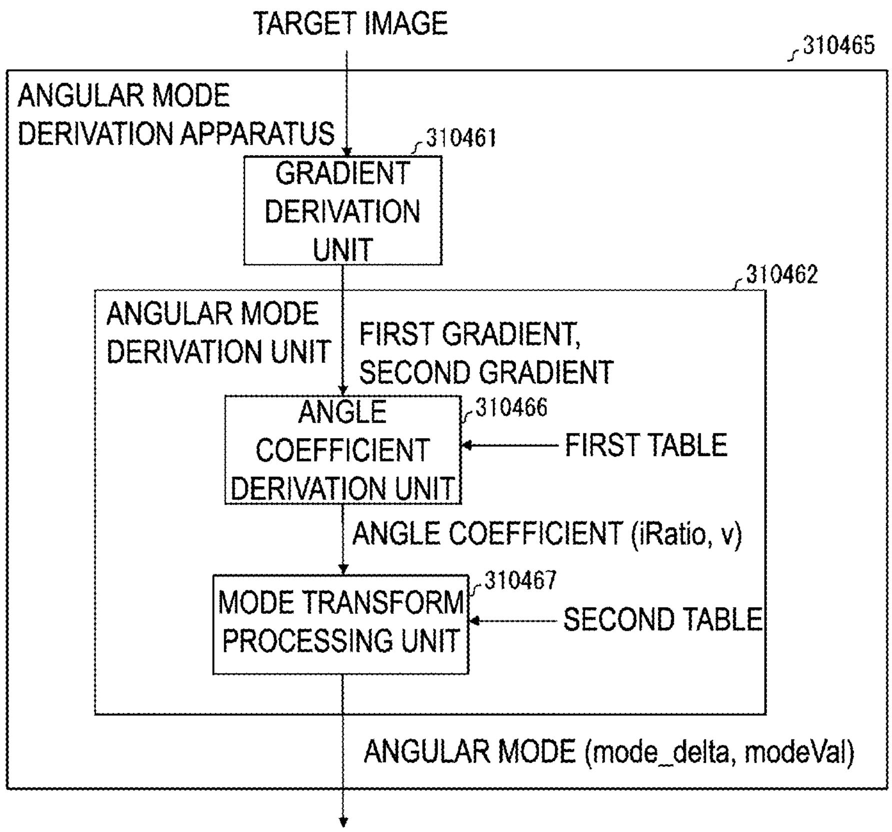
FIG. 12 is a block diagram illustrating a configuration of an angular mode derivation unit.

FIG. 12 is a block diagram illustrating a configuration of the angular mode derivation unit 310462. As illustrated in FIG. 12, an angular mode mode_delta may be derived as follows, using a first gradient, a second gradient, and two tables.

The angular mode derivation unit 310462 includes an angle coefficient derivation unit 310466 and a mode convert processing unit 310467. The angle coefficient derivation unit 310466 derives an angle coefficient iRatio (or v), based on the two gradients. Here, a slope iRatio (=absy÷absx) is derived based on an absolute value absx of the first gradient and an absolute value absy of the second gradient. As iRatio, an integer representing the ratio in units of 1/R_UNIT is used.

$$iRatio = \mathrm{int}(\mathrm{R\_UNIT} * absy/absx) \doteq \mathrm{ratio} * \mathrm{R\_UNIT}$$

R_UNIT uses a power of 2 (1<<shiftR), for example, 65536 (shiftR=16) or the like.

The following will describe a method of deriving iRatio, but the example is not limited to this one.

```
s0 = xgty ? absy : absx
s1 = xgty ? absx : absy
x = Floor ( Log2( s1 ) )
norm_s1 = (s1 << 4 >> x) & 15
v = gradDivTable[norm_s1] | 8
x += (norm_s1 != 0)
shift = 13 − x
if (shift < 0){
   shift = −shift
   add = (1 << (shift − 1))
   iRatio = (s0 * v + add) >> shift
} else {
   iRatio = (s0 * v) << shift
}
```

Here, gradDivTable={0, 7, 6, 5, 5, 4, 4, 3, 3, 2, 2, 1, 1, 1, 1, 0}.

Alternatively, the above expression "|8" may be calculated with "+8". Similarly, "|16", "|32", and "|64" can be calculated with "+16", "+32", and "+64", respectively.

Alternatively, the angle coefficient derivation unit 310466 may derive iRatio, using a LUT that outputs the same value as the above expression to the input of S0 and S1.

The mode convert processing unit 310467 derives idx from iRatio, refers to the following lookup table (LUT) using idx, and derives a first angular mode mode_delta being difference information from a reference direction.

$$idx = iRatio \gg shiftI$$

$$\mathrm{mode\_delta} = LUT[idx]$$

shiftI represents a prescribed constant, such as 10.

Here, LUT[N_LUT]={0, 1, 1, 2, 2, 3, 3, 4, 4, 4, 5, 5, 5, 5, 6, 6, 6, 6, 7, 7, 7, 7, 8, 8, 8, 8, 9, 9, 9, 9, 10, 10, 10, 10, 11, 11, 11, 11, 12, 12, 12, 12, 12, 13, 13, 13, 13, 13, 13, 14, 14, 14, 14, 14, 14, 15, 15, 15, 15, 15, 15, 16, 16, 16, 16}.

Here, N_LUT indicates the number of elements of the LUT.

$$\mathrm{N\_LUT} = (1 \ll (shiftR - shiftI)) + 1$$

Note that, in a case that iRatio is substantially 0, i.e., idx==0, the gradient is the horizontal direction or the vertical direction, and the difference from the reference direction is 0. Thus, the LUT may include elements that are a power of 2, except for the first element 0 of the LUT. The power of 2 may be N_LUT'=(1<<(shiftR−shiftI)). As the lookup table LUT' in this case, the following may be used.

$$LUT'[N\_LUT'] = \{1, 1, 2, 2, 3, 3, 4, 4, 4, 5, 5, 5, 5, 6, 6, 6, 6, 7, 7, 7, 7, 8, 8, 8, 8, 9, 9, 9, 9, 10, 10, 10, 10, 11, 11, 11, 11, 12, 12, 12, 12, 12, 13, 13, 13, 13, 13, 13, 14, 14, 14, 14, 14, 14, 15, 15, 15, 15, 15, 15, 16, 16, 16, 16\}$$

In the table, integers of 0 or greater are used, and the magnitude relationship between adjacent elements is ">=" or "<=". In the table, "integers of 0 or greater" and "values in ascending order" and "the number of elements having the same value has an increasing relationship except for the last element" are used. However, a table may be used in which "integers of 0 or greater" and "values in descending order" and "the number of elements having the same value has a decreasing relationship except for the first element" may be used. For example, LUT_dec [N_LUT']={16, 16, 16, 16, 15, 15, 15, 15, 15, 15, 14, 14, 14, 14, 14, 14, 13, 13, 13, 13, 13, 13, 12, 12, 12, 12, 12, 11, 11, 11, 11, 10, 10, 10, 10, 9, 9, 9, 9, 8, 8, 8, 8, 7, 7, 7, 7, 6, 6, 6, 6, 5, 5, 5, 5, 4, 4, 4, 3, 3, 2, 2, 1, 1}.

In this case, the mode convert processing unit 310467 derives the first angular mode mode_delta, using the following expression.

$$mode\_delta = idx\ ?\ LUT'[idx-1]\ :\ 0$$

In a case of using the table in descending order, the following is used.

$$mode\_delta = idx\ ?\ LUT\_dec[63-idx]\ :\ 0$$

By referring table in a case that idx>0 (idx!=0), the number N_LUT' of elements of the table can be a power of 2, and thus memory can be used efficiency in a case of storing the table in memory can be improved.

The mode convert processing unit 310467 adds or subtracts mode_delta to or from a reference direction base_mode [region], and thereby derives a second angular mode modeVal.

$$base\_mode[4] = \{18, 18, 50, 50\}$$

$$direction[4] = \{-1, 1, -1, 1\}$$

$$modeVal = base\_mode[region] + direction[region] * mode\_delta$$

18, being a value of base_mode, means a horizontal mode number (intra directional prediction (HOR)), and 50 means a vertical mode number (intra directional prediction (VER)). base_mode is not limited to the values.

Note that derivation of the gradient ratio iRatio and derivation of the angular mode mode_delta from the gradients may be performed in one processing. For example, the first angular mode mode_delta may be derived as follows, using the first gradient, the second gradient, and two tables. Here, the angle coefficient v is derived using a first table (gradDivTable[ ]), and the angular mode mode_delta is derived from the angle coefficient v and a second table (LUT').

$$s0 = xgty\ ?\ absy : absx$$

$$s1 = xgty\ ?\ absx : absy$$

$$x = \mathrm{Floor}(\mathrm{Log2}(s1))$$

$$norm\_s1 = (s1 \ll 4 \gg x)\ \&15$$

$$v = gradDivTable[norm\_s1] | 8$$

$$x \mathrel{+}= (norm\_s1\ \ != 0)$$

$$idx = (x < 3)\ ?\ (s0 * v) \ll (3-x) : (s0 * v) \gg (x-3)$$

$$mode\_delta = idx\ ?\ LUT'[idx-1] : 0$$

Here, "(s0*v)<<(3−x)" may be "(s0*v)<<3>>x". Here, "<<3" is not limited to 3, and "<<4", "<<5", or the like may be used with further enhanced accuracy of the angular mode. "<<" may be omitted due to modification of a table, or "<<1" or "<2" may be used.

In the above configuration, a value norm_s1 is derived using a shift based on a logarithm value x of the gradient (absx or absy) in a certain pixel. A certain slope v is derived with reference to the first table gradDivTable using norm_s1. Furthermore, idx is derived using the slope v and the shift based on the logarithm value x. The angular mode mode_delta is derived with reference to the second table LUT using Idx.

The value norm_s1 is derived using a shift based on the logarithm value x of the first gradient (absx or absy) in a certain pixel. The angle coefficient v is derived with reference to gradDivTable using norm_s1. Furthermore, idx is derived using a product of v and a second gradient (s0 or s1) different from the first gradient and the shift based on the logarithm value x. The angular mode mode_delta is derived with reference to the second table LUT (LUT') using idx. According to this, there is an effect that the angular mode can be derived from the gradients, using shift operation and table reference. By performing the shift operation once after derivation of the second table LUT, the amount of processing can be reduced.

Note that clipping may be performed as follows so that idx does not exceed a range of the number of regions of the LUT.

$$idx = \min((s0 * v) \ll 3 \gg x,\ N\_LUT - 1)$$

Furthermore, it is also appropriate to perform clipping to a prescribed value KK or less after multiplication of s0*v so as not to exceed 32 bit, for example, using a shift.

$$s0 * v = (\min(s0 * v, KK) \ll 3) \gg x$$

KK is (1<<(31−3))−1=268435455, for example.

Example of Other Table

The angular mode derivation unit 310462 may derive mode_delta as follows, using the first gradient, the second gradient, and two tables.

$$norm\_s1 = (s1 \ll 7 \gg x)\ \&127$$

-continued $$v = gradDivTable3[\text{norm\_s1}]|64$$

$$x \mathrel{+}= (\text{norm\_s1} \ != 0)$$

$$idx = (s0 * v) \gg x$$

Here, gradDivTable3={0, 63, 62, 61, 60, 59, 58, 57, 56, 56, 55, 54, 53, 52, 51, 51, 50, 49, 48, 47, 47, 46, 45, 45, 44, 43, 42, 42, 41, 40, 40, 39, 38, 38, 37, 37, 36, 35, 35, 34, 34, 33, 32, 32, 31, 31, 30, 30, 29, 29, 28, 28, 27, 27, 26, 26, 25, 25, 24, 24, 23, 23, 22, 22, 21, 21, 20, 20, 20, 19, 19, 18, 18, 18, 17, 17, 16, 16, 16, 15, 15, 14, 14, 14, 13, 13, 13, 12, 12, 12, 11, 11, 10, 10, 10, 9, 9, 9, 8, 8, 8, 8, 7, 7, 7, 6, 6, 6, 5, 5, 5, 5, 4, 4, 4, 3, 3, 3, 3, 2, 2, 2, 2, 1, 1, 1, 1, 0}

Note that the method of deriving mode_delta is not limited to this.

In derivation of idx, the angular mode derivation unit 310462 may use rounding operation as follows.

$$idx = (iRatio + roundI) \gg shiftI$$

Here, roundI=1<< (shiftI−1), and shiftI is a prescribed constant, such as 10.

In the angular mode derivation unit 310462, N_LUT, the number of elements of the LUT, may be another number such as 17, (shiftR−shiftI=4), 33 (shiftR−shiftI=5), 129 (shiftR−shiftI=7), and 257 (shiftR−shiftI=8), other than 65 (shiftR−shiftI=6) in the above example.

For example, as a case that the number of stages is greater than 65, derivation may be performed as follows.

$$idx = iRatio \gg 9$$

LUT_N128[128] =

{1, 1, 2, 2, 3, 3, 4, 4, 5, 5, 6, 6, 7, 7, 8, 8, 8, 9, 9, 9, 9, 10, 10, 10, 10, 11, 11, 11, 11, 12, 12, 12, 12, 13, 13, 13, 13, 14, 14, 14, 14, 15, 15, 15, 15, 16, 16, 16, 16, 17, 17, 17, 17, 18, 18, 18, 18, 19, 19, 19, 19, 20, 20, 20, 20, 21, 21, 21, 21, 22, 22, 22, 22, 23, 23, 23, 23, 24, 24, 24, 24, 24, 25, 25, 25, 25, 25, 25, 26, 26, 26, 26, 26, 26, 27, 27, 27, 27, 27, 27, 28, 28, 28, 28, 28, 28, 29, 29, 29, 29, 29, 29, 30, 30, 30, 30, 30, 30, 31, 31, 31, 31, 31, 31, 32, 32, 32, 32}

$$idx = (x < 4)\,?\,(s0 * v) \ll (4 - x) : (s0 * v) \gg (x - 4) = (s0 * v) \ll 4 \gg x$$

Using the table, the angular mode can be derived with accuracy of 32 directions per 90 degrees.

$$\text{mode\_delta} = idx\,?\,\text{LUT\_N128}[idx - 1] : 0$$

Using mode_delta, the mode convert processing unit 310467 derives and outputs the second angular mode modeVal.

$$modeVal = \text{base\_mode[region]} + \text{direction[region]} * \text{mode\_delta}$$

(3) Angular Mode Selection Unit

The angular mode selection unit 310463 derives representative values dimdModeVal (dimdModeVal0, dimdModeVal1, . . . ) of one or more angular modes, using modeVal (modeValPn) at multiple points Pn included in the gradient derivation target image. The representative value of the angular mode in the present embodiment is an inferred value of directionality of a texture pattern of the target block. Here, the representative value dimdModeVal is derived from the most frequent value that is derived using a histogram. The histogram (frequencyHistMode) of the value modeValPn of the angular mode modeVal obtained for each point Pn is derived, and a first mode dimdModeVal0 and a second mode dimdModeVal1 are derived by selecting a mode having the highest frequency and a mode having the second highest frequency in the frequency, respectively. The histogram may be derived by incrementing a value of HistMode by 1 at each point Pn.

$$HistMode[modeValPn] \mathrel{+}= 1$$

Furthermore, HistMode[x] is scanned with respect to x, and a value of x to give the largest value of HistMode is dimdModeVal0 and x to give the second largest value is dimdModeVal1.

```
for (x = 0 x < Nidx x++) {
  if (HistMode[x] > maxVal) {
    maxVal = HistMode[x]
    dimdModeVal1 = dimdModeVal0
    dimdModeVal0 = x
  }
}
```

Note that the method of deriving dimdModeVal0 or dimdModeVal1 is not limited to the histogram. For example, the angular mode selection unit 310463 may set an average value of modeValPn equal to dimdModeVal0 or dimdModelVal1.

As a third mode, the angular mode selection unit 310463 sets a prescribed mode (for example, the intra prediction mode or a converted mode) equal to dimdModeVal2. Here, dimdModeVal2=0 (Planar), but this is not limited to this. Adaptively, another mode may be set, or the third mode need not be used.

The angular mode selection unit 310463 may further derive a weight corresponding to the representative value of each angular mode for the intra prediction in the tentative prediction image generation unit 310464 to be described later. For example, a weight w2 of the third mode is set equal to 21, and the rest is respectively distributed to weights w0 and w1 according to the ratio of the frequencies of the first and second modes in the histogram. Note that the sum of the weights is 64. Derivation of the weights is not limited to this, and the weights w0, w1, and w2 of the first, second, and third modes may be adaptively changed. For example, w2 may be increased or decreased according to the number of the first mode or the second mode, the frequency, or the ratio thereof. Note that, for each of the first to third modes, in a case of not using the mode, the angular mode selection unit sets the value of the corresponding weight equal to 0.

The angular mode selection unit 310463 includes the angular mode selection unit that selects the angular mode representative value from multiple angular modes derived in pixels in the gradient derivation target image, and can thereby derive the angular mode having higher accuracy.

As described above, the angular mode selection unit 310463 selects the angular mode (the representative value of the angular mode) inferred from the gradients, and outputs the angular mode together with the weight corresponding to each angular mode.

According to the angular mode derivation apparatus 310465 (the gradient derivation unit 310461, the angular mode derivation unit 310462, or/and the angular mode selection unit 310463), there is an effect that derivation of the angle corresponding to arctan from the gradient ratio iRatio is simple because the derivation is performed using the table.

The configuration of the gradient derivation unit, the angular mode derivation unit, and the angular mode selection unit may be used for derivation of information other than the intra prediction mode. For example, in a case that the angular mode selection unit selects a transform matrix of a residual using the directionality of the texture pattern derived by the gradient derivation unit and the angular mode derivation unit, a matrix suitable for the transform of the residual in a region having the directionality can be selected, and therefore enhancement of coding efficiency can be expected.

(4) Tentative Prediction Image Generation Unit

The tentative prediction image generation unit 310464 generates a prediction image (tentative prediction image) using one or more input angular mode representative values (intra prediction modes). In a case that one intra prediction mode is used, an intra prediction image in the prediction mode is generated, and is output as a tentative prediction image q[x][y]. In a case that multiple intra prediction modes are used, prediction images (pred0, pred1, and pred2) for the prediction modes are generated. The multiple prediction images are combined using corresponding weights (w0, w1, and w2), and are output as a tentative prediction image q[x][y]. The tentative prediction image q[x][y] is derived as follows.

$$q[x][y] = (w0 * pred0[x][y] + w1 * pred1[x][y] + w2 * pred2[x][y]) \gg 6$$

Note that, in a case that frequency of the second mode is 0 or the directional prediction mode is not used (DC mode or the like), a prediction image pred0 in a first prediction mode is used as the tentative prediction image.

The inverse quantization and inverse transform processing unit 311 performs inverse quantization on a quantized transform coefficient input from the entropy decoder 301 to derive a transform coefficient. This quantized transform coefficient is a coefficient obtained by performing, in coding processing, a frequency transform such as a Discrete Cosine Transform (DCT) or a Discrete Sine Transform (DST) on prediction errors for quantization. The inverse quantization and inverse transform processing unit 311 performs an inverse frequency transform such as an inverse DCT or an inverse DST on the transform coefficient to calculate a prediction error. The inverse quantization and inverse transform processing unit 311 outputs the prediction error to the addition unit 312.

Figure 13:
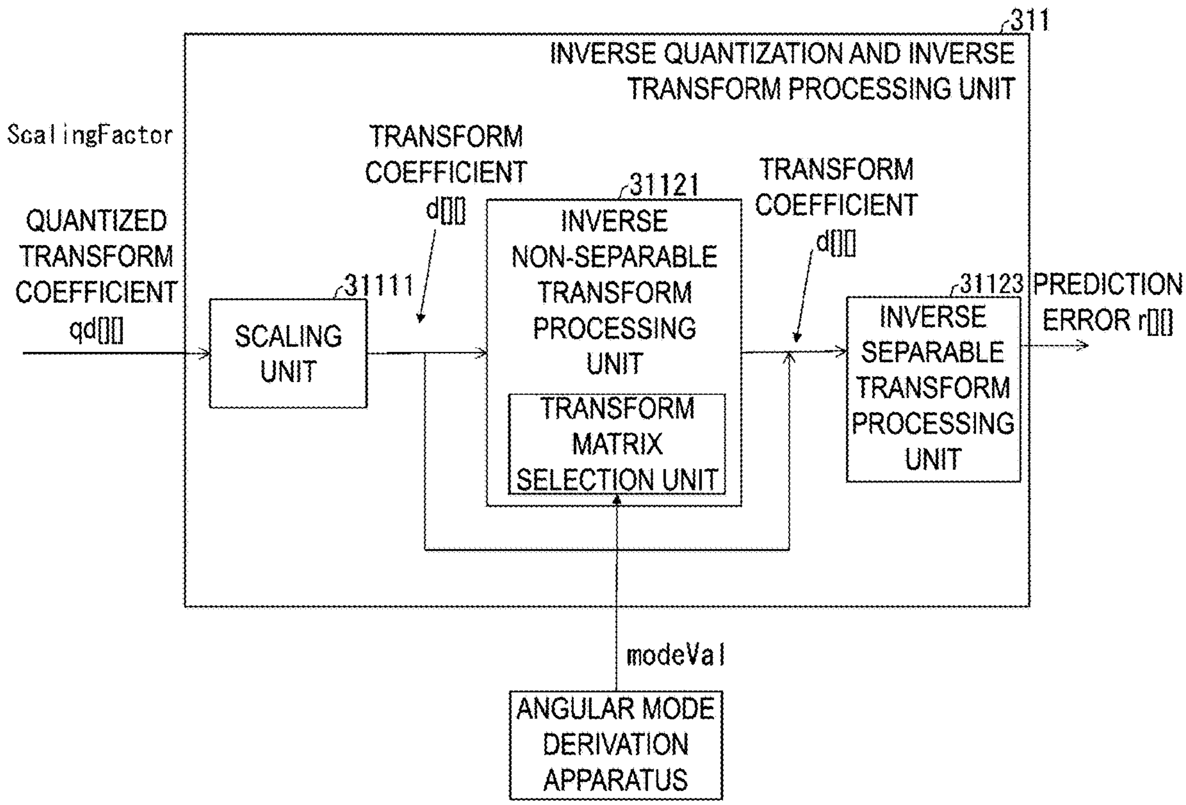
FIG. 13 is a functional block diagram illustrating a configuration example of an inverse quantization and inverse transform processing unit.

FIG. 13 is a block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse separable transform processing unit 31123. Note that the transform coefficient decoded from coded data may be transformed using the angular mode derived by the angular mode derivation apparatus 310465.

The inverse quantization and inverse transform processing unit 311 scales (inverse-quantizes) the quantized transform coefficient qd[ ][ ] input from the entropy decoder 301 to derive a transform coefficient d[ ][ ] by using the scaling unit 31111. The quantized transform coefficient qd[ ][ ] is a coefficient obtained by performing transform such as Discrete Cosine Transform (DCT) and Discrete Sine Transform (DST) on a prediction error and quantizing the transformed prediction error or a coefficient obtained by further performing non-separable transform on the transformed coefficient in a coding processing. In a case that non-separable transform flag lfnst_idx!=0, the inverse quantization and inverse transform processing unit 311 performs the inverse transform, using the inverse non-separable transform processing unit 31121. Inverse frequency transform such as inverse DCT and inverse DST is further performed on the transform coefficient, and the prediction error is calculated. In a case that lfnst_idx==0, an inverse frequency transform such as inverse DCT and inverse DST is performed on the transform coefficient scaled by the scaling unit 31111 without performing processing in the inverse non-separable transform processing unit 31121, and the prediction error is calculated. The inverse quantization and inverse transform processing unit 311 outputs the prediction error to the addition unit 312.

The inverse non-separable transform processing unit 31121 rearranges a transform coefficient d[ ][ ] of a part of the TU in a one-dimensional array u[ ]. Specifically, the inverse non-separable transform processing unit 31121 derives u[ ] from the two-dimensional transform coefficient d[ ][ ] of the target TU indicated by a region RU with reference to the transform coefficient of x=0, . . . , nonZeroSize−1. xC and yC are positions on the TU, and are derived from the array DiagScanOrder indicating the scan order and the position x of the array u[ ].

$$xC = DiagScanOrder[\log2StSize][\log2StSize][x][0]$$

$$yC = DiagScanOrder[\log2StSize][\log2StSize][x][1]$$

$$u[x] = d[xC][yC]$$

The transform matrix selection unit included in the inverse non-separable transform processing unit 31121 may select one of secTransMatrix0 to secTransMatrix4 as follows according to the angular mode modeVal (for example, dimdModeVal0) derived by the angular mode derivation apparatus 310465.

$$secTransMatrix[][] = secTransMatrix0\ (dimdModeVal0 < 10)$$

$$secTransMatrix[][] = secTransMatrix1\ (\text{except above, } dimdModeVal0 < 26)$$

$$secTransMatrix[][] = secTransMatrix2\ (\text{except above, } dimdModeVal0 < 42)$$

$$secTransMatrix[][] = secTransMatrix3\ (\text{except above, } dimdModeVal0 < 58)$$

$$secTransMatrix[][] = secTransMatrix4\ (\text{except above})$$

In the above, the angular mode is classified using prescribed threshold values 10, 26, 42, and 58, and the transform matrix is assigned according to the classification. The transform matrix may be directly derived from the angular mode indicating the transform matrix, instead of the transform matrix. Note that the thresholds used for classification of the angular mode are not limited to the above. Derivation may be performed as follows, using the number of transform matrices such as values of 0 to 4 as values of the LUT.

$$secTransMatrix[][] = secTransMatrix0\ (dimdModeVal0 == 0)$$

$$secTransMatrix[][] = secTransMatrix1\ (dimdModeVal0 == 1)$$

$$secTransMatrix[][] = secTransMatrix2\ (dimdModeVal0 == 2)$$

$$secTransMatrix[][] = secTransMatrix3\ (dimdModeVal0 == 3)$$

$$secTransMatrix[][] = secTransMatrix4\ (dimdModeVal0 == 4)$$

The inverse non-separable transform processing unit 31121 transforms u[ ] having a length of nonZeroSize using a transform matrix secTransMatrix [ ][ ], and derives a coefficient v[ ] of a one-dimensional array having a length of nStOutSize as an output.

$$v[i] = \mathrm{Clip3}(CoeffMin, CoeffMax, \Sigma(secTransMatrix[i][j] * u[j] + 64) \gg 7)$$

Here, Σ is the sum up to j=0, . . . , nonZeroSize−1. Processing is performed on i=0, . . . , nStSize−1. CoeffMin and CoeffMax indicate a range of transform coefficient values.

The inverse non-separable transform processing unit 31121 allocates the coefficient v[ ] of the transformed one-dimensional array at a prescribed position in the TU (d[ ][ ]) again. Specifically, the following processing is performed on x=0, . . . , nStSize−1 and y=0, . . . , nStSize−1.

$$\text{if } (transposeFlag == 0)$$

$$d[x][y] = (y < 4\ \&\&\ x < 0)\ ?\ v[x + (y << \log2StSize)] : d[x][y])$$

$$\text{else}$$

$$d[x][y] = (x < 4\ \&\&\ y < 0)\ ?\ v[y + (x << \log2StSize)] : d[x][y])$$

According to the above, the transform coefficients are transformed according to the angular mode derived from neighboring image pixels by the angular mode derivation apparatus 310465 (the gradient derivation unit 310461, the angular mode derivation unit 310462, the angular mode selection unit 310463), and therefore there is an effect that efficiency is enhanced.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 11:
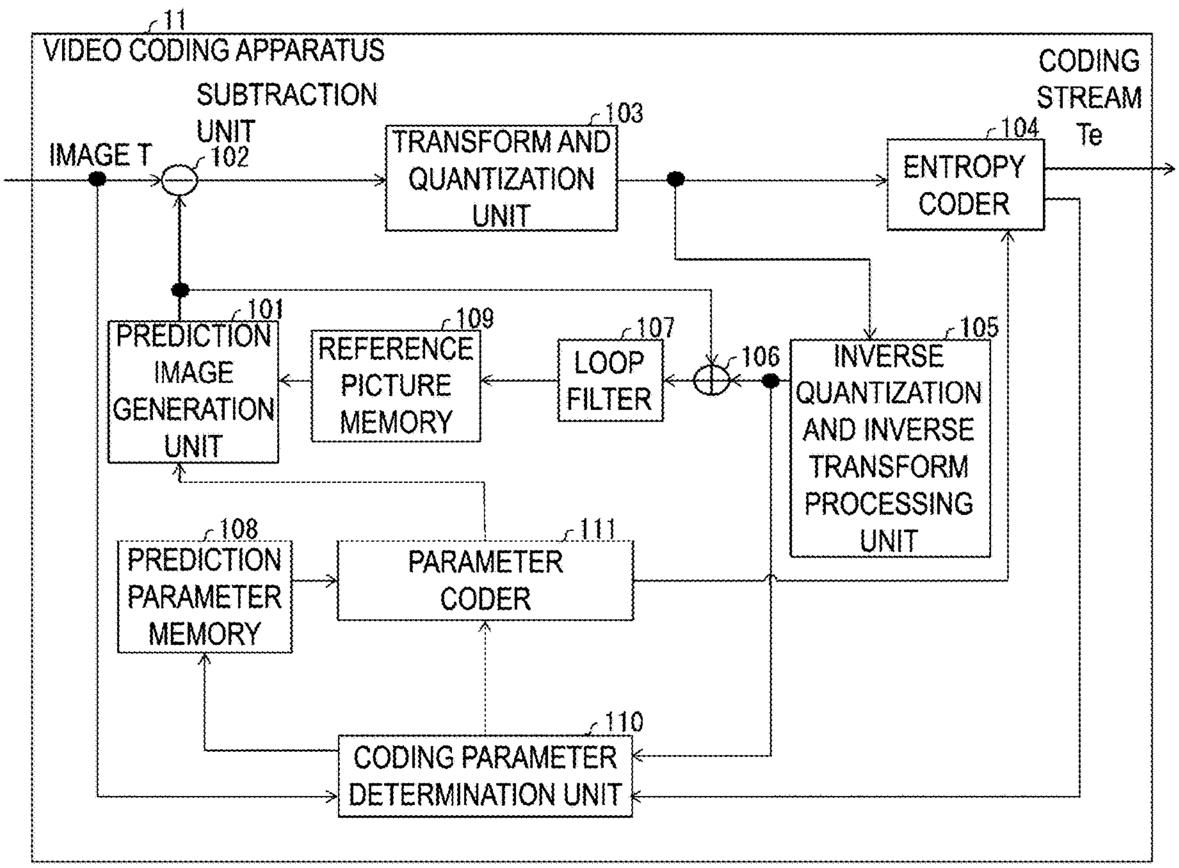
FIG. 11 is a block diagram illustrating a configuration of a video coding apparatus.

Next, a configuration of the video coding apparatus 11 according to the present embodiment will be described. FIG. 11 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the entropy coder 104 and the inverse quantization and inverse transform processing unit 105.

The inverse quantization and inverse transform processing unit 105 is the same as the inverse quantization and inverse transform processing unit 311 (FIG. 4) of the video decoding apparatus 31, and descriptions thereof are omitted. The calculated prediction error is output to the addition unit 106.

The entropy coder 104 receives input of the quantized transform coefficient from the transform and quantization unit 103, and input of coding parameters from the parameter coder 111. The entropy coder 104 performs entropy coding on the split information, the prediction parameters, the quantized transform coefficient, and the like to generate and output a coding stream Te.

The parameter coder 111 includes a header coder 1110, a CT information coder 1111, a CU coder 1112 (prediction mode coder), an inter prediction parameter coder 112, and an intra prediction parameter coder 113 that are not illustrated. The CU coder 1112 further includes a TU coder 1114.

Configuration of Intra Prediction Parameter Coder 113

The intra prediction parameter coder 113 codes IntraPredMode and the like input from the coding parameter determination unit 110. The intra prediction parameter coder 113 includes a partly identical configuration to a configuration in which the intra prediction parameter decoder 304 derives the intra prediction parameters.

The addition unit 106 adds a pixel value of the prediction image of the block input from the prediction image generation unit 101 and the prediction error input from the inverse quantization and inverse transform processing unit 105 for each pixel to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets. The coding parameter determination unit 110 selects a set of coding parameters of which the calculated cost value is a minimum value. In this manner, the entropy coder 104 outputs a selected set of coding parameters as a coding stream Te. The coding parameter determination unit 110 stores the determined coding parameters in the prediction parameter memory 108.

Note that some of the video coding apparatus 11 and the video decoding apparatus 31 in the above-described embodiments may implement, with a computer, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111. In that case, this configuration may be realized by recording a program for realizing such control functions on a computer-readable recording medium and causing a computer system to read the program recorded on the recording medium for execution. Note that the "computer system" described here refers to a computer system built into either the video coding apparatus 11 or the video decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

In addition, some or all of the video coding apparatus 11 and the video decoding apparatus 31 in the embodiment described above may be realized as integrated circuits such as a large-scale integration (LSI). Each function block of the video coding apparatus 11 and the video decoding apparatus 31 may be individually realized as processors, or some or all thereof may be integrated into processors. In addition, the circuit integration technique is not limited to LSI, and may be realized as dedicated circuits or a multi-purpose processor. Furthermore, in a case that advances in the semiconductor technology lead to the advent of a circuit integration technology that replaces LSI, an integrated circuit based on the technology may be used.

Although embodiments of the present invention have been described above in detail with reference to the drawings, the specific configurations thereof are not limited to those described above and various design changes or the like can be made without departing from the spirit of the invention.

A video decoding apparatus, a video coding apparatus, and an angular mode derivation apparatus according to an aspect of the present invention may be expressed as follows.

Provided are a video decoding apparatus and an angular mode derivation apparatus, including: a gradient derivation unit configured to derive a gradient of a pixel value in a top and left neighboring block of a target block; an angular mode derivation unit configured to derive an angular mode corresponding to the gradient; an angular mode selection unit configured to select the derived angular mode; and a tentative prediction image derivation unit configured to derive a tentative prediction image, based on the angular mode. The derivation is performed based on a table including the angular mode corresponding to the gradient.

The table includes difference information from a reference direction of an intra directional prediction mode corresponding to the gradient.

The difference information is a positive integer.

The angular mode selection unit performs the selection, using an average value of the derived angular mode.

Provided are a video coding apparatus and an angular mode derivation apparatus, including: a gradient derivation unit configured to derive a gradient of a pixel value in a top and left neighboring block of a target block; an angular mode derivation unit configured to derive an angular mode corresponding to the gradient; an angular mode selection unit configured to select the derived angular mode; and a tentative prediction image derivation unit configured to derive a tentative prediction image, based on the angular mode. The derivation is performed based on a table including the angular mode corresponding to the gradient.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
303 Inter prediction parameter decoder
304 Intra prediction parameter decoder
308 Prediction image generation unit
309 Inter prediction image generation unit
310 Intra prediction image generation unit
31046 DIMD prediction unit
310465 Angular mode derivation apparatus
310461 Gradient derivation unit
310462 Angular mode derivation unit

310463 Angular mode selection unit
310464 Tentative prediction image generation unit
311 Inverse quantization and inverse transform processing unit
312 Addition unit
11 Image coding apparatus
101 Prediction image generation unit
102 Subtraction unit
103 Transform and quantization unit
104 Entropy coder
105 Inverse quantization and inverse transform processing unit
107 Loop filter
110 Coding parameter determination unit
111 Parameter coder
112 Inter prediction parameter coder
113 Intra prediction parameter coder
1110 Header coder
1111 CT information coder
1112 CU coder (prediction mode coder)
1114 TU coder

The invention claimed is:

1. A video decoding apparatus comprising:

a gradient derivation circuit that derives a gradient of each pixel value in a block adjacent to upper and left side of a target block;

an angular mode derivation circuit that derives an angular mode corresponding to each gradient;

an angle mode selection circuit that selects a representative value from each angle mode; and a temporary prediction image derivation circuit that generates a temporary prediction image based on the representative value of each angle mode, wherein:

each angular mode is derived from an index of an angular mode table, the index being derived using each gradient and the angular mode table, and a prediction image is generated by correcting the temporary prediction image based on an intra prediction mode.

2. A video coding apparatus comprising:

a gradient derivation circuit that derives a gradient of each pixel value in a block adjacent to upper and left side of a target block;

an angular mode derivation circuit that derives an angular mode corresponding to each gradient;

an angle mode selection circuit that selects a representative value from each angle mode; and a temporary prediction image derivation circuit that generates a temporary prediction image based on the representative value of each angle mode, wherein:

each angular mode is derived from an index of an angular mode table, the index being derived using each gradient and the angular mode table, and a prediction image is generated by correcting the temporary prediction image based on an intra prediction mode.

* * * * *